United States Patent Office 2,763,625
Patented Sept. 18, 1956

2,763,625

WATER-SOLUBLE PROTEIN RESIN COPOLYMER

Bernard D. Illingsworth, John R. Dann and John W. Gates, Jr., Rochester, N. Y., assignors to Eastman Kodak Company, Rochester, N. Y., a corporation of New Jersey No Drawing. Application April 29, 1954,
Serial No. 426,551

6 Claims. (Cl. 260—8)

This invention relates to aqueous polymeric solutions prepared by the polymerization of a protein or a saturated acyl derivative of protein with at least two unsaturated polymerizable monomers, and to compositions including mixtures of such polymers with proteins.

Gelatin and similar proteins are employed extensively in the manufacture of photographic products and similar materials wherein a colloidal emulsion is desired. Various attempts have been made to extend or supplant the gelatin with polymeric material for use in coating on film base or other film supports. In many cases, mixtures of such materials with gelatin have been unsatisfactory because of the optical and mechanical incompatibility of the added material with the gelatin and a consequent haziness of the dried film or coagulation of the emulsion. As a general rule, most of the water-soluble polymers are either incompatible with gelatin at some stage of the coating operation, or they do not maintain the properties of the gelatin to the desired extent.

In the manufacture of photographic products, it has been necessary to employ especially pure grades of gelatin in order to obtain satisfactory results. As a consequence, the use of many of the proteins available commercially was limited in the manufacture of photographic products. For example, lower grades of gelatin, glue, casein, and the like could not be readily employed, and hence the cost of making photographic emulsions was relatively high.

It is accordingly an object of this invention to provide certain new and improved aqueous polymeric dispersions which are capable of forming layers having good photographic properties either alone or in admixture with gelatin.

It is another object of this invention to prepare polymeric material by the graft polymerization of at least two unsaturated monomers with a protein or an acylated protein derivative to give products which form aqueous solutions which can be used directly in the manufacture of photographic emulsions, and which give dried films which are water soluble but which can be hardened with formaldehyde and similar gelatin hardeners when admixed with gelatin and, in some cases, when used alone.

Another object of the invention is to provide aqueous polymeric solutions which can be mixed with gelatin over a wide range of proportions without causing haziness in the dried coating or coagulation during the coating operation, and which are effective to act as gelatin extenders without appreciably affecting the refractive index of the gelatin.

Another object of the invention is ot prepare water-soluble graft polymers by the polymerization of a mixture of at least two vinylic or diolefinic polymerizable monomers with an unsubstituted protein or a saturated acyl protein derivative.

Other objects will be apparent from the description and claims which follow.

These and other objects of the invention are attained by preparing water-soluble polymeric material consisting of 60–100% by weight of combined hydrophilic material and 0–40% by weight of hydrophobic material by polymerizing a mixture of 5–95% of saturated protein material, which can be either unsubstituted protein or a saturated acylated protein, and 95–5% by weight of polymerizable monomeric material including 0–40% by weight of the mixture of hydrophobic monomer, the monomeric material comprising at least two polymerizable monomers containing a —CH=C< group. The monomeric material can be either vinylic or diolefinic or a mixture of both. The monomers can all be hydrophilic in which case the monomers can amount to 95–5% by weight of the mixture, all hydrophobic in which case the amount of monomer is 5–40% of the weight of the mixture, or a mixture of hydrophobic and hydrophilic monomers in which the combined monomer weight can be 95–5% of the mixture but the hydrophobic monomer content is not more than 40% of the mixture. The polymers embodying this invention are water-soluble, and the solutions thereby obtained are suitable for use over the pH range of 2 to 11 which is ordinarily encountered in the manufacture of photographic materials. The products are compatible with conventional photographic gelatins and with degraded gelatins to give mixtures which will produce clear flexible coating suitable for use in the photographic art. The polymers can be prepared using both low and high grade proteins or protein derivatives.

The polymer dispersions of this invention can be used directly for the preparation of films, and the dried films prepared from such solutions are normally water soluble and can be readily redispersed in hot water. The polymers prepared from unsubstituted proteins can be hardened by treatment with formaldehyde or similar gelatin hardeners and hence can be readily employed as a substitute for photographic gelatin or as an additive for photographic gelatin. The physical properties can be controlled over a rather wide range by a suitable choice of the protein component, and particularly of the polymerizable unsaturated monomers. Although the polymers prepared from acylated proteins are not hardened directly by formaldehyde, mixtures with gelatin can be so hardened.

The polymers which are prepared in accordance with this invention are actual chemical combinations of the protein component and the polymerizable monomer, and are probably formed by a type of graft polymerization between the growing polymer chains and the protein molecule. They must, therefore, be distinguished from the mere physical mixtures of protein and polymers which have been employed heretofore. The exact nature of the polymeric material of the invention is not readily defined. However, the polymers exhibit a unitary character quite unlike the characteristics of mixtures.

In practicing the invention, the hydrophilic component or components amounting to 60–100% of the reactants being polymerized can be the saturated protein material alone or the combination therewith of one or more hydrophilic monomers if desired. Thus, two or more hydrophilic monomers can be used for polymerizing with the protein material, such as any combination of acrylic acid; methacrylic acid; vinyl pyridines such as 4-vinyl pyridine, 2-vinyl pyridine, 2-methyl-5-vinyl pyridine or the like; acrylamides or methacrylamides including the N-substituted acrylamides or methacrylamides such as N-methyl acrylamide or the like; or similar well-known hydrophilic monomers. In such case, the saturated protein material amounts to 5–95% of the weight of the mixture being polymerized and the combined weight of the hydrophilic monomers can be 95–5% of the weight of the mixture.

Similarly, the monomeric material can consist of two o more hydrophobic monomers such as any combination of acrylonitrile or acrylonitrile derivatives, styrene or styrene derivatives, alkyl acrylates or methacrylates, vinyl esters, vinyl chloride and similar well-known hydrophobic monomers. In this case, the protein component forms 60–95% of the weight of the mixture, and the hydrophobic monomers form 5–40% of the weight.

When a combination of hydrophobic and hydrophilic monomers is used, the hydrophobic monomer does not exceed 40% of the weight of the mixture and the combined weight of protein component and hydrophilic monomer is at least 60% of the weight of the mixture.

The saturated protein component which is employed in preparing the polymeric materials of this invention can be an unsubstituted protein such as gelatin, hydrolyzed gelatin, glue, casein, soybean protein, or the like, or it can be an acylated protein such as succinyl protein, phthalyl protein, or acetyl protein prepared by reacting an organic acid anhydride or chloride with a protein such as glue, gelatin, casein, or the like. Such acylated protein derivatives are known to the art, and the preparation of a phthalic anhydride derivative of gelatin suitable for use in practicing the invention is described in Yutzy and Frame, U. S. Patent No. 2,525,753. Other protein derivatives can be prepared in similar fashion by reacting any of the well known proteins with any of the saturated organic acid anhydrides. Thus, for example, a method of preparing derivatives of other proteins than gelatin is described in the copending application of Lowe and Gates, Serial No. 768,480, now Patent No. 2,691,982. Since such unsubstituted proteins and saturated acyl protein derivatives are well known in the art, and such proteins and protein derivatives are all suitable for use in practicing this invention, it is not intended that this invention shall be limited to the particular materials described herein with reference to certain preferred embodiments of the invention. One advantage of this invention resides in the fact that the protein which can be employed need not be in a highly purified state such as was necessary with photographic gelatin alone. Thus, lower grades of gelatin, glue, casein, or the like can be satisfactorily employed in practicing the invention since the graft polymers obtained therefrom do not adversely affect photographic emulsions.

The polymerizable monomers which are graft polymerized with the protein or acyl protein derivative can be mixtures of two or more of any of the well known olefinic polymerizable monomers, including the vinylic monomers and the diolefinic monomers. Thus, for example, the vinylic monomers can include styrene or substituted styrenes, acrylic acid esters, methacrylic acid esters, vinyl ethers, vinyl ketones, vinylidene chloride, vinyl chloride, vinyl esters, acrylonitrile, substituted acrylonitriles, vinyl pyridines, acrylamides, allylamines, and similar well known vinylic monomers. Similarly, the polymerizable diolefins such as 1,3-butadiene, isoprene, chloroprene, 2,3-dimethyl-1,3-butadiene and similar diolefinic monomers are entirely suitable for use in practicing the invention.

Typical monomers which can be employed in practicing the invention include ethyl acrylate, n-propyl acrylate, isopropyl acrylate, isobutyl acrylate, n-amyl acrylate, isoamyl acrylate, n-hexyl acrylate, 2-ethylhexyl acrylate, n-octyl acrylate, n-decyl acrylate, $\beta$-cyanoethyl acrylate, $\beta$-chloroethyl acrylate, n-butyl acrylate, 2-methoxyethyl acrylate, 2-ethoxyethyl acrylate, 2-butoxyethyl acrylate, and similar alkyl acrylates wherein the alkyl group contains from 1 to 10 carbon atoms; methacrylates containing from 1 to 10 carbon atoms, and preferably from 4 to 10 carbon atoms in the alkyl group, such as n-butyl methacrylate, n-hexyl methacrylate, 2-ethylhexyl methacrylate, n-octyl methacrylate, ethyl methacrylate, methyl methacrylate and the like; styrene monomers such as styrene or a substituted styrene such as o-methyl styrene, m-methyl styrene, p-methyl styrene, 2,4-dimethyl styrene, 2,5-dimethyl styrene, 3,4-dimethyl styrene, 3,5-dimethyl styrene, 2,4,5-trimethyl styrene, 2,4,6-trimethyl styrene, 2,4,5-triethylstyrene, o-ethylstyrene, m-ethylstyrene, p-ethylstyrene, 3,5-diethyl styrene, p-n-butyl styrene, m-sec-butyl styrene, m-tert-butyl styrene, p-hexyl styrene, p-n-heptyl styrene, p-2-ethylhexyl styrene, o-fluoro styrene, m-fluoro styrene, p-fluoro styrene, o-chloro styrene, m-chloro styrene, p-chloro styrene, 2,3-dichloro styrene, 2,4-dichloro styrene, 2,5-dichloro styrene, 2,6-dichloro styrene, 3,4-dichloro styrene, 3,5-dichloro styrene, 2,3,4,5,6-pentachloro styrene, m-trifluoromethyl styrene, o-cyano styrene, m-cyano styrene, m-nitro styrene, p-nitro styrene, p-dimethyl amino styrene, and similar styrene derivatives; acrylonitrile monomers such as acrylonitrile or a substituted acrylonitrile such as methacrylonitrile, $\alpha$-chloroacrylonitrile, $\alpha$-bromoacrylonitrile, trifluoromethyl acrylonitrile, $\alpha$-trifluoromethylcarboxy acrylonitrile, and the like; vinyl esters such as vinyl acetate, vinyl propionate, vinyl butyrate, or the like; vinyl pyridines such as 4-vinyl pyridine, 2-methyl-5-vinyl pyridine and the like; vinyl ketones such as methylvinyl ketone, ethylvinyl ketone, and the like; vinyl ethers such as methylvinyl ether and the like; alkenyl esters such as isopropenyl acetate and the like, and similar well known polymerizable unsaturated monomers such as acrylic acid, allylamine, acrylamide, methacrylamide, N-alkyl acrylamides such as N-methyl acrylamide and N-methyl methacrylamide and the like.

The polymeric solutions of this invention are prepared by solution polymerization in an aqueous system with or without a micell-forming surface-active agent. The use of a surface-active agent facilitates the dispersion of the monomer in the water. The surface-active agents which can be employed in practicing the invention include the cationic surfactants, anionic surfactants, and amphoteric surfactants. Such surface-active materials which form micells are well known in the art, and it is not intended that the invention shall be limited to the particular surfactants which are particularly described herein. Any of the other micell-forming surface-active agents can be employed in practicing the invention with advantageous results. Typical surfactants which can be employed in practicing the invention are the salts of the higher fatty acids such as sodium stearate, potassium stearate, sodium palmitate, potassium palmitate, sodium laurate, potassium laurate, sodium myristate, potassium myristate, and the like; salts of higher fatty alcohol sulfates such as the sodium or potassium lauryl sulfates, sodium or potassium di-(2-ethylhexyl) sulfosuccinates, sodium or potassium cetyl sulfates, sodium or potassium stearyl sulfates, and the like; salts of aromatic sulfonic acids such as the sodium or potassium salt or an alkyl naphthalene sulfonic acid; high molecular weight quaternary ammonium salts containing the radical $C_{15}H_{31}$ or $C_{17}H_{35}$; and similar well known micell-forming surface-active agents.

The polymerization in accordance with this invention is facilitated by the use of a polymerization catalyst. Such polymerization catalysts are well known in the art, and any of the well known catalytic materials or combinations such as are commonly employed in promoting emulsion polymerizations can be used. Thus, for example, the per-catalysts are entirely suitable, including the organic peroxides such as benzoyl peroxide, acetyl peroxide, lauroyl peroxide, tert. butyl hydroperoxide, and hydrogen peroxide; persulfates such as sodium, potassium or ammonium persulfates, or persulfuric acid itself; perborates such as sodium or potassium perborates; water-soluble salts of percarbonic acid; water-soluble salts of perphosphoric acid; water-soluble salts of sulfo-peracids; and similar well known per-catalysts. If desired, the redox-type catalysts can be used in practicing the invention, and in some cases this may be desirable in order to carry out the reaction at a lower temperature or in a shorter time than can be obtained using an oxygenated catalyst alone.

The polymerization in accordance with this invention is desirably effected at an elevated temperature. Usually, a temperature of about 85° C. is satisfactory since the polymerization ordinarily occurs within a period of about one hour at this temperature. It will be understood, however, that higher or lower temperatures can be employed in accordance with well known polymerization practice. The polymerization time will, of course, depend upon the other variable factors such as the kind and concentration of catalyst, the temperature of polymerization, the nature of the polymerizing reactants, and similar variable factors. When the polymerization is effected at an elevated temperature it may be necessary to effect the polymerization in a reaction system provided with a reflux condenser or in a closed pressure system. Such expedients are well known in the art and do not form a limiting part of the present invention.

When practicing the invention, the protein or saturated protein derivative is employed in an amount of from 5 to 95% by weight of the mixture, and the combined weight of hydrophilic material is 60–100%. Polymers prepared using such amounts of hydrophilic material are readily soluble in warm water and can be redispersed from the dried film of polymer. Furthermore, it is possible to dry the polymeric solutions prepared in accordance with this invention and store them for prolonged periods of time in the dried form. The dried polymers can thereafter be readily redispersed in warm water and used in emulsion applications in the same manner as the original aqueous dispersion. Because of its inherent water solubility, the polymer need not be mixed with gelatin prior to the drying. The protein component is desirably an unsubstituted or acylated gelatin, hydrolyzed gelatin, glue, casein, or soy protein. The casein is particularly useful when it has first been modified by treating it in solution with hydrogen peroxide at an alkaline pH and at an elevated temperature to cause some oxidation. The protein can be completely unmodified, however, and such unmodified proteins give entirely satisfactory results. Any of the acyl protein derivatives can be employed provided such derivatives do not include an ethlenic unsaturation which would cause the derivative to enter into a copolymer reaction with the monomer rather than the graft polymerization which is desirably effected in accordance with this invention.

The solutions which are prepared by the process of this invention can be mixed directly with aqueous solutions of gelatin or a similar naturally occurring hydrophilic colloidal protein which has been rendered soluble or dispersible in water. The solutions of the invention are compatible with protein in all proportions, and they can be used alone or with varying amounts of another protein such as from 5 to 95% by weight of gelatin or other protein material. The coatings which are obtained from the compositions of this invention when used either alone or in admixture with gelatin or the like have good optical clarity. When the compositions are thereby employed in the manufacture of photographic materials, the mixtures of the dispersion and the gelatin are desirably adjusted to a pH value of from 4.5 to 7 during the mixing. The properties of the dried film can be varied over a considerable range by a suitable choice of the polymerizable monomers. Generally speaking, the alkyl acrylates containing from 2 to 10 carbon atoms in the alkyl group, the alkyl methacrylates containing from 4 to 10 carbon atoms in the alkyl group, and the diolefins such as butadiene, isoprene, chloroprene, and the like give polymers having moderate flexibility. The other monomers such as styrene, substituted styrenes, acrylonitrile, substituted acrylonitriles, methyl acrylate, methyl or ethyl methacrylate, vinyl acetate, vinylidene chloride, isopropenyl acetate, and the like give polymers having a lower degree of flexibility but greater film strength. The polymers of the invention can be prepared using a mixture of one or more flexibilizing monomers and one or more strengthening monomers, or two or more flexibilizing monomers or two or more strengthening monomers alone, as desired.

The compositions prepared in accordance with this invention can be employed for coatings on any of the well known film support materials using any of the conventional procedures for obtaining such coatings. Thus, for example, the polymeric solutions can be employed in coating polyester-type films, cellulose triester films, and similar film base materials or glass and paper bases. The polymeric solutions can be prepared either batchwise or in continuous fashion and can be used in the manufacture of either black-and-white or color photographic film. They can be used in the subbing layers of film or in one or more of the emulsion layers, including the emulsions carrying photosensitive materials such as the silver halides. The compositions may be employed directly without further addition, or they can be employed with dyes to provide backing layers, pigments such as barium sulfate to provide baryta coatings, or photosensitive silver halides to provide photosensitive emulsions. The polymers are advantageously employed in color emulsions containing incorporated couplers or those which are developed in a coupler diffusion process. The unsubstituted protein polymers can be hardened directly, if desired, and when hardened with formaldehyde, the polymers become water-insoluble, or they can be used without hardening to give readily dispersible layers which are soluble in warm water.

The invention is illustrated by the following examples of certain preferred embodiments thereof. It will be understood that the examples are included merely for purposes of illustration, and that the invention is not limited thereby unless otherwise specifically indicated.

*Example 1*

To a stirred solution of 2.83 grams of potassium persulfate in 173 ml. of water at 85° C. was added dropwise a solution of 89 grams of glue in 327 ml. of water and also a solution composed of 19 grams of n-butyl acrylate and 19 grams of styrene. The additions were complete in 10 minutes and the resulting solution was heated at 85° C. for an additional hour. The resulting polymer dried to a clear film which redispersed in warm water.

*Example 2*

To a stirred solution of 0.70 gram of potassium persulfate and 1.11 grams of sodium lauryl sulfate in 42.3 ml. of water at 85° C. was added dropwise a solution of 22 grams of glue and 12 grams of acrylic acid in 77 ml. of water. From another dropping funnel was added 21.4 grams of n-butyl acrylate. The additions occurred over three minutes and were followed by 30 minutes of heating at 85° C. The resulting polymer dried to a clear film that redissolved in warm water with difficulty.

*Example 3*

To a stirred solution of 0.80 gram of potassium persulfate in 283 ml. of water at 85° C. was added dropwise from a dropping funnel a solution of 15 grams of acrylic acid and 25 grams of photographic gelatin in 217 ml. of water. From another dropping funnel 10 grams of styrene was also added. The additions were carried out during five minutes and were followed by ten minutes of stirred heating at 85° C. The resulting polymer could be dried to a clear film with flexibility greater than the original photographic gelatin.

*Example 4*

To a stirred solution of 4.76 grams of potassium persulfate and 5.0 grams of sodium lauryl sulfate in 480 ml. of water at 85° C. was added dropwise a solution of 150 grams of glue in 520 ml. of water. At the same time, a solution of 73 grams of n-butyl acrylate and 31 grams of acrylonitrile was also added dropwise. The additions are complete in 25 minutes and were followed by 30 minutes of stirred heating at 85° C. The resulting polymer solution was dried to a clear film which redispersed in warm water.

*Example 5*

A stirred solution composed of 7 grams of acrylamide, 4 grams of acrylic acid, and 16.7 grams of 7% phthalyl gelatin in 100 ml. of water containing 0.35 gram of potassium persulfate was heated during 15 minutes to 90° C. and then cooled gradually to room temperature. The resulting polymer solution could be chill-set and dried in a manner conventional for gelatin manufacture. The dried polymer redispersed in warm water.

*Example 6*

A stirred solution of 10 grams of acrylamide, 5 grams of acrylic acid, and 10 grams of photographic gelatin in 225 ml. of water containing 0.32 gram of potassium persulfate was heated to 85° C. during 30 minutes and cooled. The resulting clear solution dried to a clear film.

*Example 7*

A stirred solution of 15 grams of acrylic acid, 10 grams of acrylamide, and 25 grams of photographic gelatin in 200 ml. of water containing 0.80 gram of potassium persulfate was heated to 85° C. during 10 minutes and then cooled slowly. During cooling, the polymer began to separate from solution and was redissolved by the gradual addition of 20% alkali such that a pH of 5.0 was maintained. The cooled solution was chilled, sliced and dried in a manner conventional for gelatin handling. The dried polymer redispersed in warm water and precipitated at a pH of 4.0 to 3.8 and redissolved at lower pH's by the addition of dilute acid or at higher pH's by the addition of alkali.

*Example 8*

A stirred solution of 10 grams of acrylic acid, 5 grams of acrylonitrile, 10 grams of acrylamide, and 25 grams of photographic gelatin in 200 ml. of water containing 0.80 gram of potassium persulfate was heated during 10 minutes to 185° F. and then gradually cooled. As cooling proceeded, the polymer began to separate out of solution and was redissolved by the gradual addition of alkali to a pH of 5.0. The resulting solution was cooled and dried in the conventional manner. The dry polymer redispersed in warm water and precipitated from water at a pH of 4.0 to 3.8, being soluble at higher or lower pH values. The dried polymer could be washed also in cold water to remove the excess salts without redissolving.

*Example 9*

A stirred solution of 15 grams of acrylic acid, 10 grams of acrylonitrile, 25 grams of gelatin and 0.80 gram of potassium persulfate was maintained at a temperature of 85° C. for 15 minutes. As the solution cooled, it became cloudy. The pH was raised to 5.0 with 20% NaOH, at which point the solution was again clear. It was chilled, sliced and dried following the conventional procedure for gelatin handling. The yield of dry product was 46 grams. The dried flakes dispersed in water by plumping in water and warming. The addition of acid to this solution to pH 4.0–4.5 caused the material to separate from solution. Addition of either acid or alkali redissolved the coagulum.

*Example 10*

A solution of 15 grams of 4-vinyl pyridine in 100 ml. of dilute hydrochloric acid (pH 4.0) was added to a solution of 10 grams of acrylamide, 25 grams of gelatin and 0.80 gram of potassium persulfate in 350 ml. of water and the resulting solution was stirred and heated at 85° C. for 20 minutes. The resulting solution was chilled, sliced, washed and dried. Yield of dry product was 44 grams.

*Example 11*

Similar results were obtained using acrylonitrile instead of acrylamide in the process of Example 10.

*Example 12*

A stirred mixture of 7.5 grams of n-butyl acrylate, 7.5 grams of acrylic acid, 35 grams of gelatin and 0.80 gram of potassium persulfate was maintained at 85° C. for 10 minutes. The product was a hazy hydrosol that dried to a clear, flexible film.

*Example 13*

To a stirred solution of 1.88 grams of potassium persulfate in 486 ml. of distilled water at 85° C. was added a solution of 16 grams of acrylic acid, 24 grams of acrylamide and 59 grams of gelatin in 514 ml. of water at a pH of 3.5. Eleven grams of n-butyl acrylate was added dropwise at the same time over a period of 5 minutes. The reaction mixture was stirred at 85° C. for 30 minutes and then cooled to give a slightly hazy hydrosol.

*Example 14*

A stirred solution of 15 grams of acrylic acid, 10 grams of acrylonitrile, 25 grams of gelatin, 5 grams of n-butyl acrylate, and 0.80 gram of potassium persulfate in 450 ml. of water was heated at 85° C. for 15 minutes. The product appeared as a milky dispersion. Upon addition of a small amount of alkali, a hard rubbery coagulum was formed that dissolved very slowly in excess alkali. The product chill-set when dissolved at pH 6.0.

*Example 15*

A solution of 60 grams of gelatin in 500 ml. of water was adjusted to pH 3.0 with 6N sulfuric acid and mixed with a solution of 12 grams of 4-vinyl pyridine in 200 ml. of dilute sulfuric acid (pH 3.0). To this solution was added 28 grams of acrylic acid and 1.60 grams of potassium persulfate and the resulting mixture was stirred and heated at 85° C. for 20 minutes. This material was soluble at pH's lower than 3.0, tended to separate from solution in the pH range from 3.5 to 4.5, and was soluble at pH higher than 5.0. At pH 5.0, the solution could be chilled, shredded, washed and dried in a manner similar to that used in handling gelatin solutions. The yield of dry product was 92 grams.

*Example 16*

A solution of 60 grams of gelatin in 500 ml. of water was adjusted to pH 3.0 with 6 N sulfuric acid and mixed with a solution of 20 grams of allyl amine in 200 ml. of dilute sulfuric acid (pH 3.0). To this solution was added 20 grams of acrylamide and 1.60 grams of potassium persulfate and the resulting mixture was stirred and heated at 85° C. for 15 minutes. The resulting solution was adjusted to pH 6.0 with alkali, chilled, sliced, washed and dried. The yield of dry product was 89 grams.

Similar results are obtained using other combinations of reactants, including other proteins and other saturated acyl derivatives of proteins with these and similar monomers as described herein. The polymeric dispersions and solutions prepared in accordance with this invention can be used in the photographic art in substantially every application in which gelatin has been employed heretofore. Thus, for example, the polymeric dispersions or solutions can be employed as subbing layers, as protective colloids for photographic emulsions, and as overcoats to protect the film. The polymers can also be used in antihalation backings and in sensitized emulsions. Layers formed from the polymers alone or in admixture with gelatin show properties similar to those obtained with gelatin alone. All of the polymeric solutions described in the examples were compatible with gelatin in all proportions and were readily employed as gelatin extenders.

We claim:

1. An aqueous solution of the unitary copolymerizate of (A) 60–95% by weight of protein material from the group consisting of unsubstituted proteins and acylated proteins free of olefinic unsaturation, and (B) 40–5% by weight of a mixture of at least two different types of polymerizable monomers, said monomers (B) being selected from (1) the hydrophilic monomers of the types consisting of acrylic acid, arcylamides and vinyl pyridines and (2) the hydrophobic monomers of the types consisting of acrylonitrile, styrene and alkyl acrylates wherein the alkyl group contains 4–10 carbon atoms, the total amount of said protein material (A) and any hydrophilic monomers (1) always being 60–100% of the total weight of (A) and (B), the total amount of any hydrophobic monomers (2) always being 0–40% of the total weight of (A) and (B).

2. An aqueous solution of the unitary copolymerizate of (A) 60–95% by weight of protein material from the group consisting of unsubstituted proteins and acylated proteins free of olefinic unsaturation and (B) 40–5% by weight of a mixture of monomers comprising acrylamide and acrylic acid.

3. An aqueous solution of the unitary copolymerizate of (A) 60–95% by weight of protein material from the group consisting of unsubstituted proteins and acylated proteins free of olefinic unsaturation and (B) 40–5% by weight of a mixture of monomers comprising n-butyl acrylate and acrylic acid.

4. An aqueous solution of the unitary copolymerizate of (A) 60–95% by weight of protein material from the group consisting of unsubstituted proteins and acylated proteins free of olefinic unsaturation and (B) 40–5% by weight of a mixture of monomers comprising n-butyl acrylate and styrene.

5. An aqueous solution of the unitary copolymerizate of (A) 60–95% by weight of protein material from the group consisting of unsubstituted proteins and acylated proteins free of olefinic unsaturation and (B) 40–5% by weight of a mixture of monomers comprising acrylic acid and acrylonitrile.

6. An aqueous solution of the unitary copolymerizate of (A) 60–95% by weight of protein material from the group consisting of unsubstituted proteins and acylated proteins free of olefinic unsaturation and (B) 40–5% by weight of a mixture of monomers comprising n-butyl acrylate and acrylonitrile.

References Cited in the file of this patent

UNITED STATES PATENTS

| | | |
|---|---|---|
| 1,981,102 | Hagedorn et al. | Nov. 20, 1934 |
| 2,006,002 | Schneider | June 25, 1935 |
| 2,473,929 | Wilson | June 21, 1949 |
| 2,512,697 | Te Grotenhuis | June 27, 1950 |
| 2,519,135 | Jacobson | Aug. 15, 1950 |
| 2,548,520 | Damschroeder et al. | Apr. 10, 1951 |
| 2,594,293 | Cowan et al. | Apr. 29, 1952 |